(12) United States Patent
Ye et al.

(10) Patent No.: US 11,250,600 B2
(45) Date of Patent: Feb. 15, 2022

(54) METHOD FOR PROCESSING X-RAY COMPUTED TOMOGRAPHY IMAGE USING NEURAL NETWORK AND APPARATUS THEREFOR

(71) Applicant: Korea Advanced institute of Science and Technology, Daejeon (KR)

(72) Inventors: Jong Chul Ye, Daejeon (KR); Eun Hee Kang, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 129 days.

(21) Appl. No.: 16/245,180

(22) Filed: Jan. 10, 2019

(65) Prior Publication Data
US 2019/0221011 A1    Jul. 18, 2019

(30) Foreign Application Priority Data

Jan. 12, 2018   (KR) .................. 10-2018-0004293
Apr. 11, 2018   (KR) .................. 10-2018-0041965

(51) Int. Cl.
| | |
|---|---|
| *G06K 9/00* | (2006.01) |
| *G06T 11/00* | (2006.01) |
| *G06T 5/00* | (2006.01) |
| *G06T 5/50* | (2006.01) |
| *G06T 5/10* | (2006.01) |

(52) U.S. Cl.
CPC ........... *G06T 11/006* (2013.01); *G06T 5/002* (2013.01); *G06T 5/10* (2013.01); *G06T 5/50* (2013.01); *G06T 11/008* (2013.01); *G06T 2207/10081* (2013.01); *G06T 2207/20052* (2013.01); *G06T 2207/20056* (2013.01); *G06T 2207/20064* (2013.01); *G06T 2207/20084* (2013.01); *G06T 2211/421* (2013.01); *G06T 2211/424* (2013.01)

(58) Field of Classification Search
CPC ............................................. G06T 2207/20084
See application file for complete search history.

(56) References Cited

U.S. PATENT DOCUMENTS

| | | | | |
|---|---|---|---|---|
| 10,499,857 | B1 * | 12/2019 | Nguyen | G06N 3/08 |
| 2003/0053717 | A1 * | 3/2003 | Akhan | G06T 3/4084 |
| | | | | 382/302 |
| 2016/0361041 | A1 * | 12/2016 | Barsimantov | G16H 50/30 |
| 2017/0154413 | A1 * | 6/2017 | Yu | G06K 9/6247 |
| 2018/0197317 | A1 * | 7/2018 | Cheng | G06N 3/08 |

(Continued)

OTHER PUBLICATIONS

Khandare et al NPL ("Image Denoising Using Framelet Transform", vol. 4, Issue Jun. 6, 2015, ISSN (Online): 2278-8875, p. 9). (Year: 2015).*

(Continued)

*Primary Examiner* — Oneal R Mistry
(74) *Attorney, Agent, or Firm* — Foley & Lardner LLP

(57) ABSTRACT

A method for processing an X-ray computed tomography (CT) image using a neural network and an apparatus therefor are provided. An image reconstruction method includes receiving low-dose X-ray CT data, obtaining an initial reconstruction image for the received low-dose X-ray CT data using a predetermined analytic algorithm, and reconstructing a denoised final image using the obtained initial reconstruction image and a previously trained neural network.

20 Claims, 8 Drawing Sheets

(56) References Cited

U.S. PATENT DOCUMENTS

| | | | |
|---|---|---|---|
| 2019/0102918 A1* | 4/2019 | Cong | G06T 11/005 |
| 2019/0104940 A1* | 4/2019 | Zhou | G06T 11/008 |
| 2019/0328348 A1* | 10/2019 | De Man | G06T 5/40 |

OTHER PUBLICATIONS

Yin et al ("A Tale of Two Bases: Local-Non Local Regularization on Image Patches with Convolution Framelets", arXiv: 1606.01377v3, Sep. 2016) (Year: 2016).*

Yoon et al (Deep Learning for Accelerated Ultrasound Imaging, IEEE) (Year: 2017).*

Khandare et al (Image Denoising Using Framelet Transform) (Year: 2015).*

Lee et al., "Study on the Implementation of Spiral CT using CS (compressed-sensing) and Image Characteristics," 47 pages (2013). [Eng. Abstract included].

Kim et al., "Sparse-view Spectral CT Reconstruction using Spectral Patch-based Low-Rank Penalty," *IEEE Transactions on Medical Imaging*, vol. 34, No. 3, pp. 748-760 (Mar. 2015).

Yin, et al., "A Tale of Two Bases Local-Nonlocal Regularization on Image Patches with Convolution Framelets," *SIAM Journal Imaging Science*, pp. 1-51 (Sep. 2016).

Chen, et al., "Learned Experts' Assessment-based Reconstruction Network (learn) for Sparse-Data CT," 10 pages (2017).

Han et al., "Deep Learning Interior Tomography for Region-of-Interest Reconstruction," 4 pages (Jan. 2018).

Official Action issued in co-pending Korean Patent Application No. 10-2018-0041965 dated May 17, 2019 (partial English).

* cited by examiner

METHOD FOR PROCESSING X-RAY COMPUTED TOMOGRAPHY IMAGE USING NEURAL NETWORK AND APPARATUS THEREFOR

CROSS-REFERENCE TO RELATED APPLICATIONS

This application claims priority under 35 U.S.C. § 119 to Korean Patent Application No. 10-2018-0004293 filed on Jan. 12, 2018, and Korean Patent Application No. 10-2018-0041965 filed on Apr. 11, 2018, in the Korean Intellectual Property Office, the disclosures of which are incorporated by reference herein in their entireties.

BACKGROUND

Embodiments of the inventive concept described herein relate to a method for processing images using a neural network and an apparatus therefor, and more particularly, relate to a method for reconstructing an X-ray computed tomography (CT) image including noise as a high-quality image and an apparatus therefor.

X-ray CT is a technique capable of collecting X-rays passing through the human body and obtaining images in the human body as high-quality images. However, using X-rays causes cancer to develop, since there is a high probability of being exposed. Thus, low-dose CT for reducing the amount of exposure has been developed. There are a method of reducing the amount of X-ray emission to reduce the amount of exposure and a method of reducing the number of X-ray emission to reduce the amount of exposure in the low-dose CT. Noise following the Poisson distribution is included in a low-dose CT image signal or some information of the low-dose CT image signal is lost. Since noise is included in the reconstruction image when the lost information is reconstructed using conventional methods, it is difficult to identify states in the human body.

Noise included in the low-dose CT reconstruction image may be roughly divided into two. There are local noise following the Gaussian and Poisson distributions, which occurs when capturing images with the reduced amount of X-ray emission, and non-local noise, such as streaking artifact, which occurs when capturing images with the reduced number of X-ray emission. An iterative reconstruction algorithm is used to obtain a denoised high-quality reconstruction image. Particularly, model based iterative reconstruction (MBIR) is the best example of this. This refers to a technique of mathematically modeling a CT system and iteratively reconstructing it. Furthermore, there is a manner of cancelling noise components through a supervised-learned neural network based on mass data.

SUMMARY

Embodiments of the inventive concept provide a method for processing an image to reconstruct a high-quality image using a neural image when noise exists in a low-dose CT image or when some information of the image is lost and an apparatus therefor.

Embodiments of the inventive concept provide a method for processing an image using a neural network based on a convolutional framelet and an apparatus therefor.

Embodiments of the inventive concept provide a method for processing an image to overcome the limitation of a denoising algorithm based on an existing neural network by applying a neural network based on a convolutional framelet to a framelet-based denoising algorithm.

Embodiments of the inventive concept provide a method for processing an image to increase reconstruction performance, reduce an amount of calculation necessary for reconstruction, and enhanced reconstruction speed by configuring a neural network using a local basis and a non-local basis according to a convolutional framelet.

According to an exemplary embodiment, an image reconstruction method may include receiving low-dose X-ray computed tomography (CT) data, obtaining an initial reconstruction image for the received low-dose X-ray CT data using a predetermined analytic algorithm, and reconstructing the obtained initial reconstruction image as a final image denoised using a previously trained neural network.

The reconstructing as the final image may include reconstructing the final image denoised by applying a framelet-based denoising algorithm to the neural network.

The reconstructing as the final image may include reconstructing the final image denoised by applying a convolutional framelet to the neural network.

The reconstructing as the final image may include reconstructing the final image by reconstructing an image denoised by applying the framelet-based denoising algorithm to the neural network, and by iteratively performing a process of updating an image denoised by applying the framelet-based denoising algorithm to the neural network with respect to the reconstructed image.

The obtaining of the initial reconstruction image may include obtaining the initial reconstruction image using an analytic algorithm including a Feldkamp-Davis-Kress (FDK) algorithm and a filtered-backprojection (FBP) algorithm.

The reconstructing as the final image may include transforming the initial reconstruction image into signals of predetermined different domains, adjusting coefficients of each of the transformed signals using a local basis function and a non-linear function, reconstructing the adjusted coefficients using dual basis vectors, and inversely transforming the initial reconstruction image into the final image using the reconstructed coefficients corresponding to the different domains.

The reconstructing as the final image may include reconstructing the final image denoised using a convolutional neural network (CNN).

The transforming of the initial reconstruction image into the signals of the different domains may include transforming the initial reconstruction image into multiple feature signals by applying a non-local basis transform to the initial reconstruction image.

The transforming of the initial reconstruction image into the signals of the different domains may include transforming the initial reconstruction image into frequency domains, each of which has a different directional component of noise, by applying at least one of a wavelet transform, a discrete cosine transform, and a Fourier transform to the initial reconstruction image.

According to an exemplary embodiment, an image reconstruction method may include receiving low-dose X-ray CT data, obtaining an initial reconstruction image for the received low-dose X-ray CT data using a predetermined analytic algorithm, and reconstructing the obtained initial reconstruction image as a final image denoised by applying a framelet-based denoising algorithm to a previously trained neural network.

The neural network may have an encoding part and a decoding part which are in a symmetric architecture.

According to an exemplary embodiment, an image reconstruction device may include a reception unit configured to receive low-dose X-ray CT data, an acquisition unit configured to obtain an initial reconstruction image for the received low-dose X-ray CT data using a predetermined analytic algorithm, and a reconstruction unit configured to reconstruct the obtained initial reconstruction image as a final image denoised using a previously trained neural network.

The reconstruction unit ay be configured to reconstruct the final image denoised by applying a framelet-based denoising algorithm to the neural network.

The reconstruction unit may be configured to reconstruct the final image denoised by applying a convolutional framelet to the neural network.

The reconstruction may be configured to reconstruct the final image by reconstructing an image denoised by applying the framelet-based denoising algorithm to the neural network, and by iteratively performing a process of updating an image denoised by applying the framelet-based denoising algorithm to the neural network with respect to the reconstructed image.

The acquisition unit may be configured to obtain the initial reconstruction image using an analytic algorithm including an FDK algorithm and an FBP algorithm.

The reconstruction may be configured to transform the initial reconstruction image into signals of predetermined different domains, adjust coefficients of each of the transformed signals using a local basis function and a non-linear function, reconstruct the adjusted coefficients using dual basis vectors, and inversely transform the initial reconstruction image into the final image using the reconstructed coefficients corresponding to the different domains.

The reconstruction may be configured to reconstruct the final image denoised using a CNN.

The reconstruction unit may be configured to transform the initial reconstruction image into multiple feature signals by applying a non-local basis transform to the initial reconstruction image.

The reconstruction unit may be configured to transform the initial reconstruction image into frequency domains, each of which has a different directional component of noise, by applying a wavelet transform to the initial reconstruction image.

The neural network may have an encoding part and a decoding part which are in a symmetric architecture.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
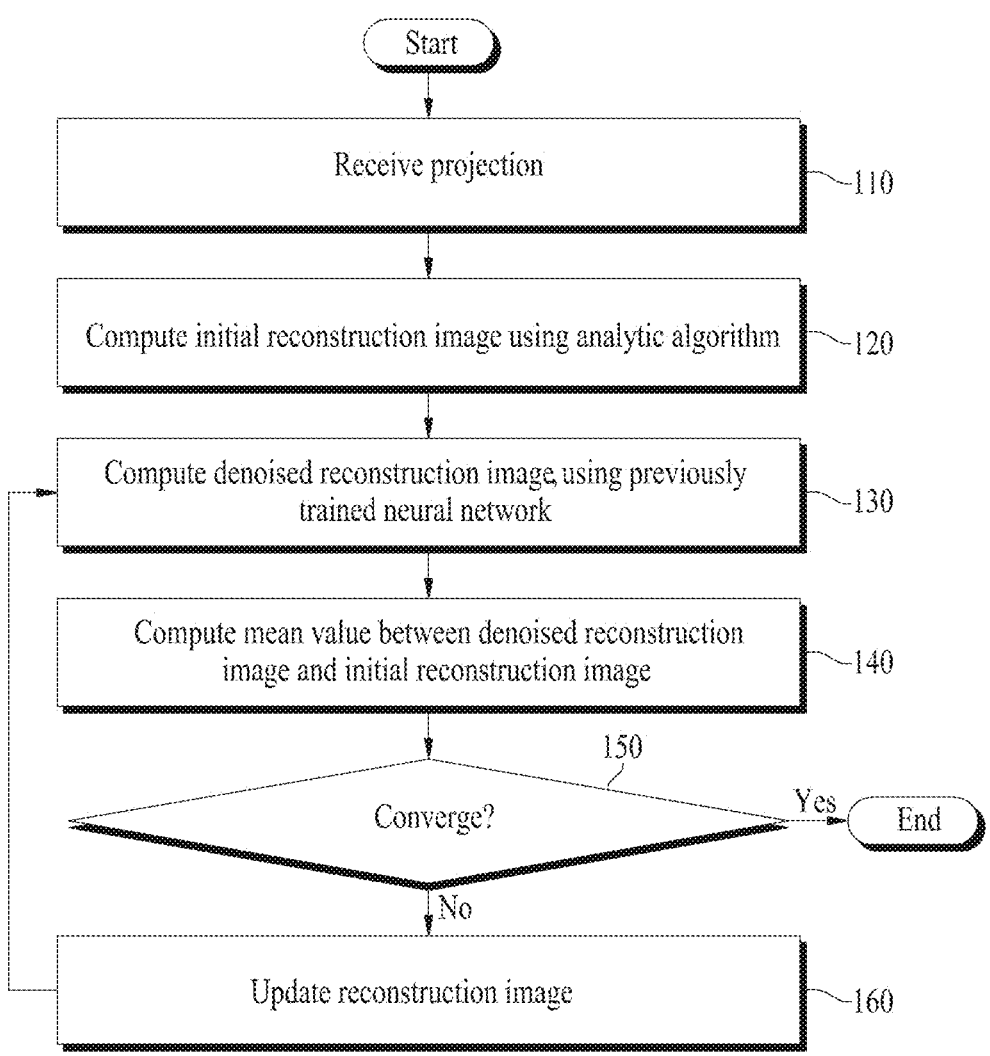
FIG. 1 is a flowchart illustrating an operation of an image reconstruction method according to an embodiment of the inventive concept.

Hereinafter, a description will be given in detail of embodiments with reference to the accompanying drawings. However, the present disclosure is restricted or limited to embodiments of the present disclosure. Further, like reference numerals shown in each drawing indicates like members.

Embodiments of the inventive concept may be the gist of overcoming the limitation of a denoising algorithm based on an existing neural network and reconstructing an X-ray computed tomography (CT) image including noise as a high-quality image by applying a neural network based on a convolutional framelet to a framelet-based denoising algorithm.

Herein, since a neural network is a kind of convolutional framelet, an embodiment of the inventive concept may apply the framelet-based denoising algorithm to the neural network to reconstruct the X-ray CT image including the noise as the high-quality image.

Hereinafter, a description will be given in detail of an embodiment of the inventive concept of combining the neural network with the framelet-based denoising algorithm with reference to FIGS. 1 to 8.

FIG. 1 is a flowchart illustrating an operation of an image reconstruction method according to an embodiment of the inventive concept.

Referring to FIG. 1, in operation 110, the image reconstruction method according to an embodiment of the inventive concept may be to receive CT data (a projection). In operation 120, the image reconstruction method may be to apply an analytic algorithm to the received CT data to compute an initial reconstruction image.

Herein, the analytic algorithm may include a Feldkamp-Davis-Kress (FDK) algorithm and a filtered-backprojection (FBP) algorithm. In addition, the analytic algorithm may include all algorithms capable of reconstructing a CT image.

The CT data received in operation 110 may include low-dose X-ray CT data.

Subsequently, iterative image processing may start. The iterative image processing may be, which is a denoising procedure, a process of reconstructing a high-quality image.

When the initial reconstruction image is computed in operation 120, in operation 130, the image reconstruction method may be to compute a denoised reconstruction image for the initial reconstruction image using a previously trained neural network. In operation 140, the image reconstruction method may be to compute a mean value between the initial reconstruction image and the denoised reconstruction image.

When the mean value between the initial reconstruction image and the denoised reconstruction image is computed in operation 140, in operation 150, the image reconstruction method may be to determine whether the denoised reconstruction image converges based on the computed mean value. When it is determined that the denoised reconstruction image converges, the image reconstruction method may be to end the process. When it is determined that the denoised instruction image does not converge, in operation 160, the image reconstruction method may be to update the reconstruction image.

In this case, as the reconstruction image is updated, a CT system may iteratively perform operations 130 to 160 until the denoised reconstruction image converges.

An embodiment of the inventive concept may independently reconstruct an image of the CT system using a trained neural network. Furthermore, this is applicable to the trained neural network used in an embodiment.

Figure 2:
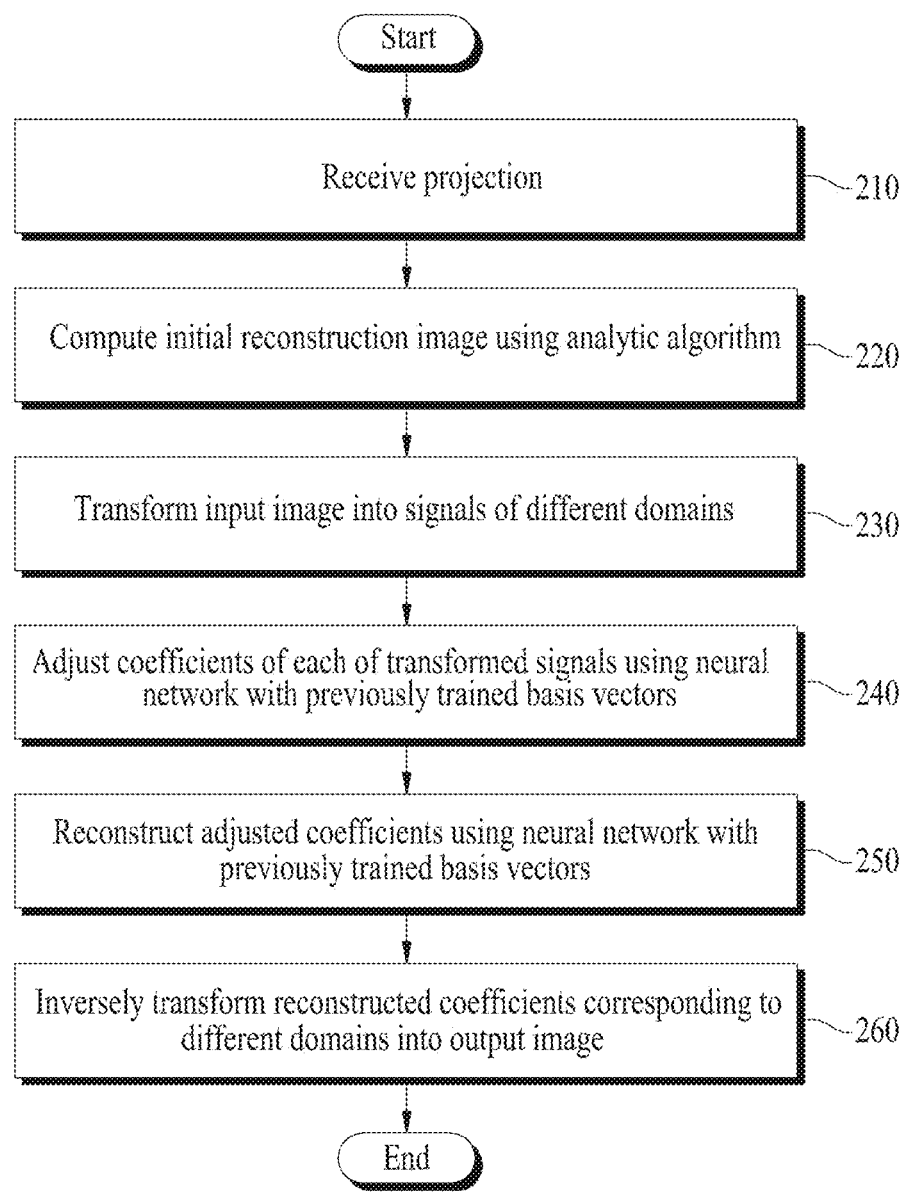
FIG. 2 is a flowchart illustrating an embodiment of a process of reconstructing an image using a trained neural network.

FIG. 2 is a flowchart illustrating an embodiment of a process of reconstructing an image using a trained neural network. Operations 230 to 260 may be operations of an embodiment for operation 130 shown in FIG. 1.

Referring to FIG. 2, in operation 210, a process of reconstructing an image using a trained neural network may be to receive CT data (projection). In operation 220, the process may be to apply an analytic algorithm to the received CT data to compute (or obtain) an initial reconstruction image.

Herein, the analytic algorithm may include an FDK algorithm and an FBP algorithm. In addition, the analytic algorithm may include all algorithms capable of reconstructing a CT image.

When the initial reconstruction image is computed in operation 220, in operation 230, the process may be to transform an input image, that is, the computed initial reconstruction image, into signals of different domains.

For example, an image processing device may decompose an input image into signals corresponding to different domains using a non-local basis transform, for example, a wavelet transform. In other words, the image processing device may transform the input image into frequency domains, each of which has a different directional component of noise, using the wavelet transform. When characteristics of noise included in the input image are well represented in the wavelet transform, an inverse wavelet transform is possible. For example, the wavelet transform may include techniques such as a cosine transform, a sine transform, and a Fourier transform. This is applicable to a transform of greater than or equal to a two-dimensional (2D) signal other than a one-dimensional (1D) signal.

Herein, the signals corresponding to the different domains may refer to multiple feature signals. The non-local basis transform may be to transform a coefficient component of a specific signal into multiple feature signals without the loss of signal.

When the input image is transformed into the signals of the different domains in operation 230, in operation 240, the image processing device may apply a neural network with previously trained basis vectors to adjust coefficients of each of the transformed signals. In operation 250, the image processing device may reconstruct the adjusted coefficients using a neural network with previously trained dual basis vectors. For example, the image processing device may adjust and reconstruct coefficients of a locally or non-locally transformed signal using the neural network.

In this case, operation 240 may be, which is an operation of adjusting the coefficients of each of the transformed signals using a local basis and a non-linear function, an operation of cancelling local noise or non-local noise included in a coefficient component of a specific signal.

Operation 250 may be an operation of reconstructing a lost component of the remaining signal coefficients.

Herein, the neural network may include a convolutional neural network (CNN).

The neural network may be configured with various layers. Herein, the layer may include a convolutional layer or a non-linear layer. Furthermore, the neural network may include a batch normalization layer and may perform a leveling operation. In addition, the neural network may include a channel concatenation layer for concatenating output results of a plurality of layers and a residual and sum layer for adding previous output results.

When coefficients for each of the signals of the different domains are reconstructed in operation 250, in operation 260, the image processing device may apply the neural network to inversely transform the reconstructed coefficients of each of the signals corresponding to the different domains into an output image.

Operation 260 may be an operation of reconstructing the reconstructed coefficients of each of the signals corresponding to the different domains as a result image using an inverse non-local basis transform. For example, operation 260 may be an operation of transforming a coefficient component of a specific signal into a final result image to which the inverse non-local basis transform is applied.

According to an embodiment of the inventive concept, the convolutional framelet may analytically analyze the neural network. According to an embodiment, the neural network may be configured based on the convolutional framelet. In detail, the convolutional framelet may configure and analyze a form of a neural network suitable for various cases by representing an input signal as a local basis or a non-local basis. Performance and convergence in the framelet-based denoising algorithm have proven.

Figure 3:
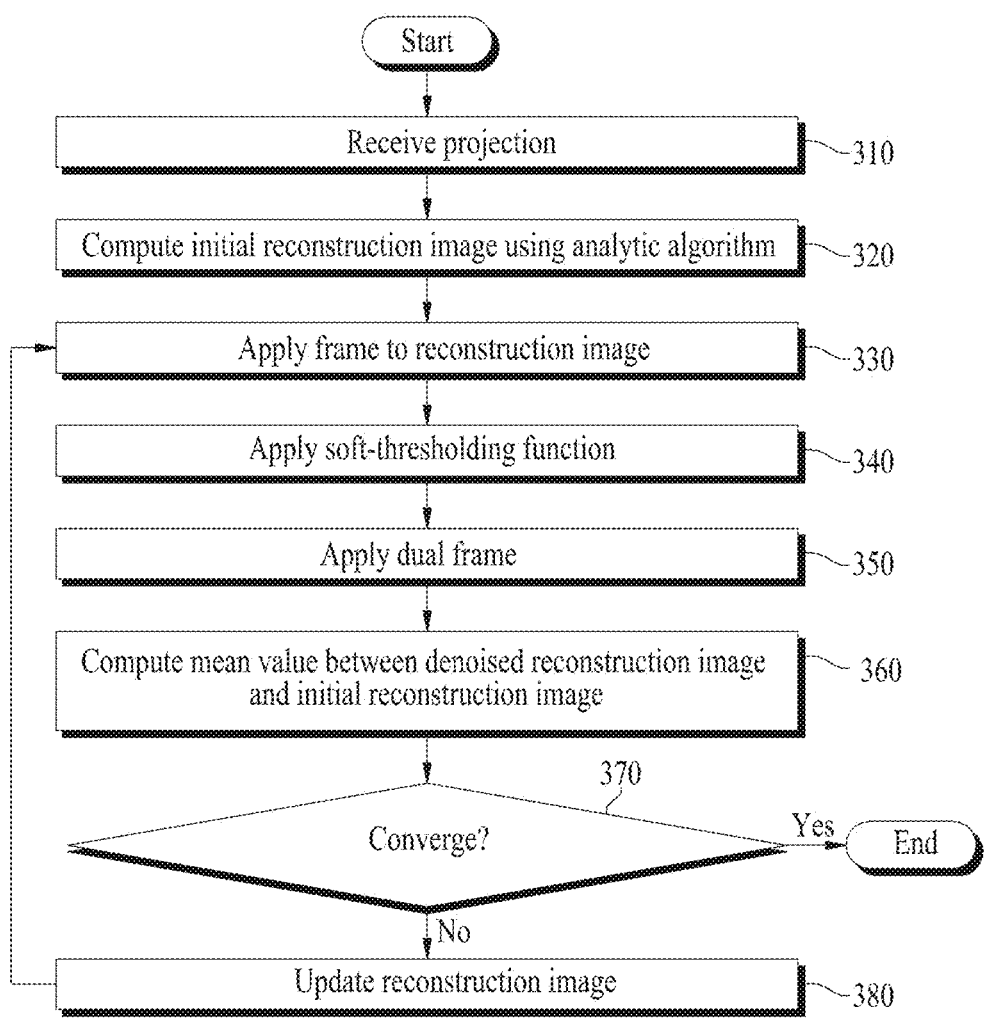
FIG. 3 is a flowchart illustrating a method for processing an image according to another embodiment of the inventive concept.

FIG. 3 is a flowchart illustrating a method for processing an image according to another embodiment of the inventive concept. FIG. 3 is a flowchart illustrating a process of applying a framelet-based denoising algorithm to reconstruct an image.

Referring to FIG. 3, in operation 310, a process of reconstructing an image using a trained neural network in the image processing method according to another embodiment of the inventive concept may receive CT data (a projection). In operation 320, the process may be to apply an analytic algorithm to the received CT data to compute an initial reconstruction image.

Herein, the analytic algorithm may include an FDK algorithm and an FBP algorithm. In addition, the analytic algorithm may include all algorithms capable of reconstructing a CT image.

When the initial reconstruction image is computed in operation 320, in operation 330, the process may be to apply a frame to an input image, that is, the computed initial reconstruction image to transform the initial reconstruction image into multiple feature signals.

When the initial reconstruction image is transformed into the multiple feature signals by the frame in operation 330, in operation 340, the process may be to apply a soft-thresholding function, which is a non-linear function, to the transformed multiple feature signals. In operation 350, the process may be to apply a dual frame to compute a denoised reconstruction image. In operation 360, the process may be to compute a mean value between the initial reconstruction image and the denoised reconstruction image.

When the mean value between the initial reconstruction image and the denoised reconstruction image is computed in operation 360, in operation 370, the process may be to determine whether the reconstruction image denoised by a framelet-based denoising algorithm converges based on the computed mean value. When it is determined that the denoised reconstruction image converges, the process may be ended. When it is determined that the denoised reconstruction image does not converge, in operation 380, the process may be to update the reconstruction image.

In this case, as the reconstruction image is updated, a CT system may repeat operations 330 to 380 until the reconstruction image denoised by the framelet-based denoising algorithm converges. In other words, the CT system may iteratively perform a framelet and a non-linear function to output the denoised reconstruction image and may output the denoised reconstruction image using a convolutional framelet.

A description will be given in detail of such a framelet-based denoising algorithm.

The frame may refer to a basis vector w which satisfies a condition such as Equation 1 below.

$$\alpha \|f\|^2 \le \|wf\|^2 \le \beta \|f\|^2, \forall f \in H, \alpha, \beta > 0 \quad \text{[Equation 1]}$$

Herein, f denotes the denoised image, and $\alpha$ and $\beta$ denote the frame bounds.

The recovery of the original signal may be done from the frame coefficient c=WF using the dual frame W. The dual frame W may satisfy the frame condition $W^TW=I$, since $f=W^Tc=W^TWf=f$, where $W^T$ denotes the synthesis operator and T denotes the Hermitian transpose.

The framelet-based denoising algorithm may refer to a technique of solving the following problem. First of all, the CT initial reconstruction image may be modeled as Equation 2 below.

$$g = f + e \quad \text{[Equation 1]}$$

Herein, g denotes the CT initial reconstruction image including noise and e denotes the noise.

f may be obtained by defining the minimization problem like Equation 3 below.

$$\min_{f,\alpha} \frac{\mu}{2}\|g-f\|^2 + \frac{1-\mu}{2}\{\|wf-\alpha\|^2 + \lambda\|\alpha\|_1\} \quad \text{[Equation 3]}$$

Herein, $\lambda, \mu > 0$ denotes the regularization parameters.

Equation 3 above may obtain the final result by iteratively updating f like Equation 4 below.

$$f_{n+1} = \mu g + (1-\mu) w^T T_\lambda(w f_n) \quad \text{[Equation 4]}$$

Herein, $\mu$ denotes the constant, w and $w^T$ denote the frame and the dual frame, $T_\lambda$ denotes the soft-thresholding function (or operator) which is the non-linear function, with the threshold value of $\lambda$, and $f_n$ denotes the n-th update.

Figure 4:
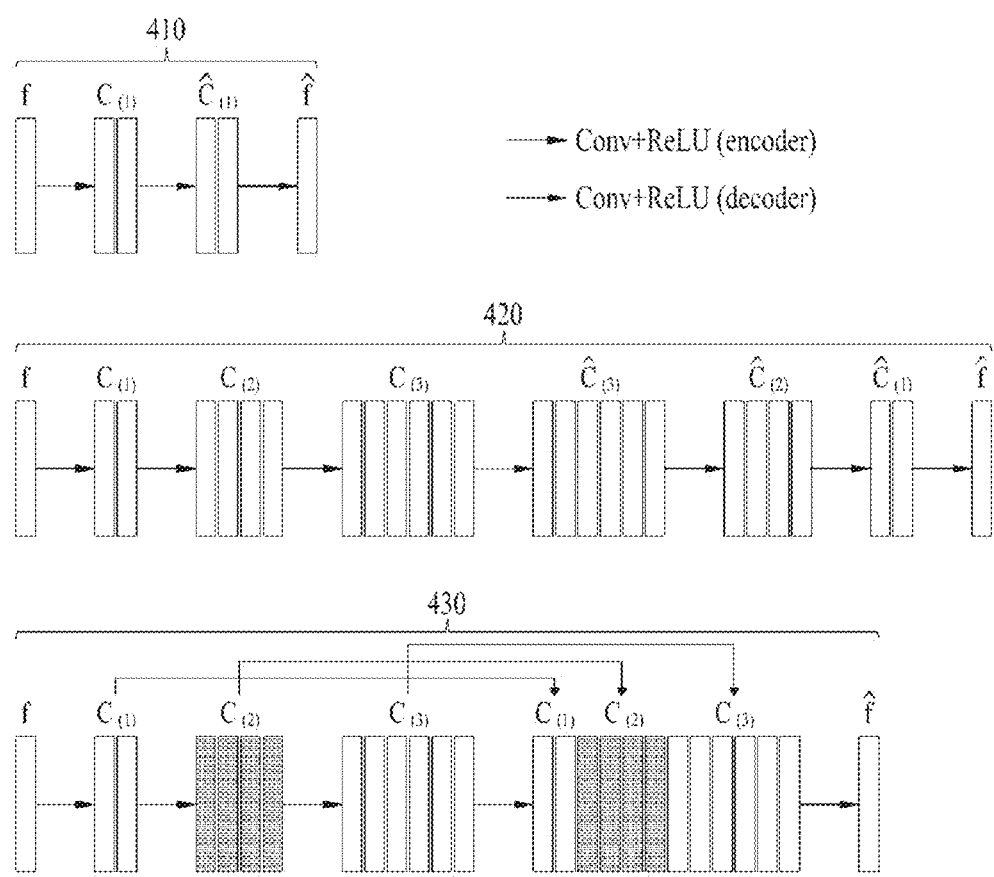
FIG. 4 is a drawing illustrating a neural network based on a convolutional framelet and an extended neural network according to an embodiment.

As may be observed in FIG. 4 above, an embodiment of the inventive concept may reconstruct the high-quality image by the framelet-based denoising algorithm by applying the frame, the dual frame, and the soft-thresholding function which is the non-linear function and iteratively updating the input signal f.

FIG. 4 is a drawing illustrating a neural network based on a convolutional framelet based on a convolutional framelet and an extended neural network according to an embodiment of the inventive concept.

The convolutional framelet may be represented for the input signal f using the local basis $\psi_j$ and the non-local basis $\phi_i$ to be similar to the above-mentioned framelet and may be represented as Equation 5 below.

$$f = \frac{1}{d}\sum_{i=1}^{n}\sum_{j=1}^{a}\langle f, \phi_i \otimes \psi_j\rangle \tilde{\phi}_i \otimes \tilde{\psi}_j \quad \text{[Equation 5]}$$

Herein, $\phi_i$ denotes the linear transform operator with the non-local basis vector, and $\psi_j$ denotes the linear transform operator with the local basis vector.

In this case, the local basis vector and the non-local basis vector may have the dual basis vectors $\tilde{\phi}_i$ and $\tilde{\psi}_j$, respectively, which are orthogonal to each other. The orthogonal relationship between the basis vectors may be defined as Equation 6 below.

$$\Phi\tilde{\Phi}^T = \sum_{i=1}^{m}\tilde{\phi}_i\phi_i^T = I_{n\times n},$$

$$\Psi\tilde{\Psi}_i = \sum_{j=1}^{a}\psi_j\tilde{\psi}_j^T = I_{d\times d} \quad \text{[Equation 6]}$$

Using Equation 6 above, the convolutional framelet may be represented as Equation 7 below.

$$H_d(f) = \Phi\Phi^T H_d(f)\Psi\Psi^T = \Phi C\Psi^T$$

$$C = \Phi^T H_d(f)\Psi = \Phi^T(f \otimes \Psi) \quad \text{[Equation 7]}$$

Herein, $H_d$ denotes the Hankel matrix operator, which may allow the convolutional operation to be represented as the matrix multiplication, and c denotes the convolutional framelet coefficient which is the signal transformed by the local basis and the non-local basis.

The convolutional framelet coefficient C may be reconstructed as the original signal by applying the dual basis vectors $\tilde{\phi}_i$ and $\tilde{\psi}_j$. The reconstruction process may be represented as Equation 8 below.

$$f = (\Phi C) \otimes \tau(\Psi) \quad \text{[Equation 8]}$$

Reference numeral 410 in FIG. 4 denotes the neural network composed of one layer configured with the local basis vector and the dual local basis vector. Reference numeral 420 in FIG. 4 denotes the extended neural network based on the convolutional framelet, which has an encoding part and a decoding part which are in a symmetric architecture. Thus, since the neural network has the meaning of the local basis and dual local basis vectors, it may be applied to the framelet-based denoising algorithm.

Applying the neural network, for example, the recursive neural network (RNN) to the framelet-based denoising algorithm, Equation 4 above may change to Equation 9 below.

$$f_{n+1} = \mu g + (1-\mu) Q(f_n) \quad \text{[Equation 9]}$$

Herein, Q denotes the trained neural network.

In an embodiment of the inventive concept, to optimally perform frame-based denoising, the frame bases should have good energy compaction properties.

The channel concatenation layer is represented in reference number 403 of FIG. 4, and it may be represented as the convolutional framelet. Herein, in reference numeral 430 of FIG. 4, decoding may be performed using a single multi-channel convolution after concatenating outputs of the encoding part. The result $Z_i$ of the convolution layer configuring the network may be represented as Equation 10 below. The channel concatenation layer may be represented as Equation 11 below.

$$Z_l = C^{(1)} \otimes \tau(\Psi^{(1)})$$
$$\vdots$$
$$Z_l = C^{(L)} \otimes \tau(\Psi^{(L)}) \dots \otimes \tau(\Psi^{(1)}),$$
$$C^{(i)} = \begin{cases} C^{(i-1)} \otimes \Psi^{(i)}, & 1 \le i \le L \\ Z_l, & i = 0 \end{cases}$$

[Equation 10]

$$Z_l = \sum_{i=1}^{L} w_i(c^{(i)} \otimes h^{(i)})$$
$$h^{(i)} = \tau(\tilde{\Psi}^{(i)}) \dots \otimes \tau(\tilde{\Psi}^{(1)}),$$
$$\sum_{i=1}^{L} w_i = 1$$

[Equation 11]

As seen be observed in Equation 11, it may be seen that the channel concatenation layer results in the signal boosting effect.

Figure 5:
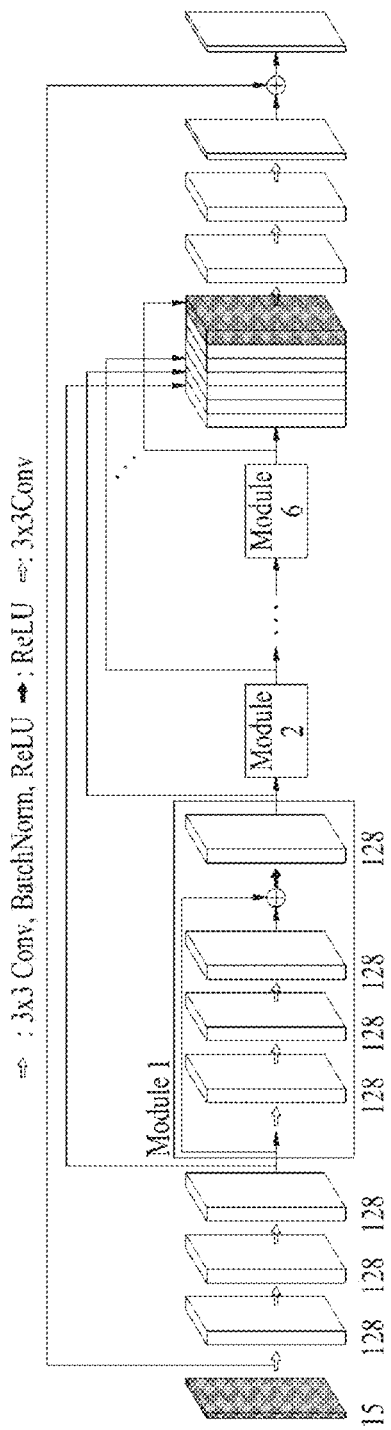
FIG. 5 is a drawing illustrating an example of a process of processing an image using a neural network according to an embodiment of the inventive concept.

FIG. 5 is a drawing illustrating an example of a process of processing an image using a neural network according to an embodiment of the inventive concept. As shown in FIG. 5, the process of processing the image may be for applying a wavelet transform which is a non-local basis to an input image to divide the input image into signals of different frequency domains and for applying a local basis and a dual local basis configuring a trained neural network to adjust and reconstruct the divided signals. Furthermore, a channel concatenation layer and a residual and sum layer may be applied.

Referring to FIG. 5, a neural network based on a convolutional framelet in an embodiment of the inventive concept may include three unique components, for example, a contourlet transform, concatenation, and a skipped connection (or a bypass connection). In other words, the neural network based on the convolutional framelet in an embodiment of the inventive concept may have a form which is extended from an existing network structure and may have a structure including a residual layer in each sub-band in the existing neural network structure. As such, the neural network structure (or architecture) in an embodiment of the inventive concept may be a neural network based on the theory of the deep convolutional framelet.

The contourlet transform may be non-subsampled contourlet transform to generate 15 channels inputs. There is no downsampling or upsampling in the filter banks of the corresponding configuration. The contourlet transform may use 4 level decomposition and 8, 4, 2, 1 directional separations for each level, which produces the total 15 bands. The first convolution layer may use 3×3×15 convolution kernels to produce 128 channel feature maps. The shift invariant contourlet transform may perform the patch processing, and an embodiment of the inventive concept may use 55×55×15 patches. The final contourlet coefficients may be obtained by taking patch averaging. Furthermore, the neural network structure according to an embodiment of the inventive concept may use a rectified linear unit (ReLU) to increase to 135×2=270. A sufficient condition for perfectly reconstructing the image may be satisfied based on such a structure, that is, 270 output channels which are bigger than 128 channels. The first layer may perform a low-rank approximation of the first layer Hankel matrix. Then, the following convolution layers may use 3×3×128 convolution kernels, which is again believed to perform low rank approximation of the extended Hankel matrix approximation. As shown in FIG. 5, the network structure according to an embodiment of the inventive concept may include 6 modules composed of convolution, batch normalization, and ReLU layers, and a bypass connection with a convolution and ReLU layer and may have the end-to-end bypass to estimate the noisefree contourlet coefficients. Herein, the end-to-end bypass may be the input end of each mode and the output end of the last module, and the noisefree contourlet coefficients may be estimated using channel transform through the end-to-end bypass. Furthermore, the network structure according to an embodiment of the inventive concept may include the concatenation layer as shown in reference numeral 430 of FIG. 4. The concatenation layer may concatenate the outputs of the individual modules, which is followed by the convolution layer with 128 sets of 3×3×896 convolution kernels. The last convolution layer may be configured with 15 sets of 3×3×128 convolution kernels.

An embodiment of the inventive concept may train two networks, for example, a feed-forward network and an RNN. Herein, an embodiment of the inventive concept may use a stochastic gradient descent optimization method to train the two networks. The individual networks may be first trained using a database which consists of quarter-dose and routine-dose CT images. After the network converged initially, the next-stage training may proceed sequentially. The next-stage training may be achieved by adding a database which consists of iterative inference results and routine-dose CT images. The final-stage training may be achieved by adding a database in which both input and target images are routine-dose CT images.

Figure 6:
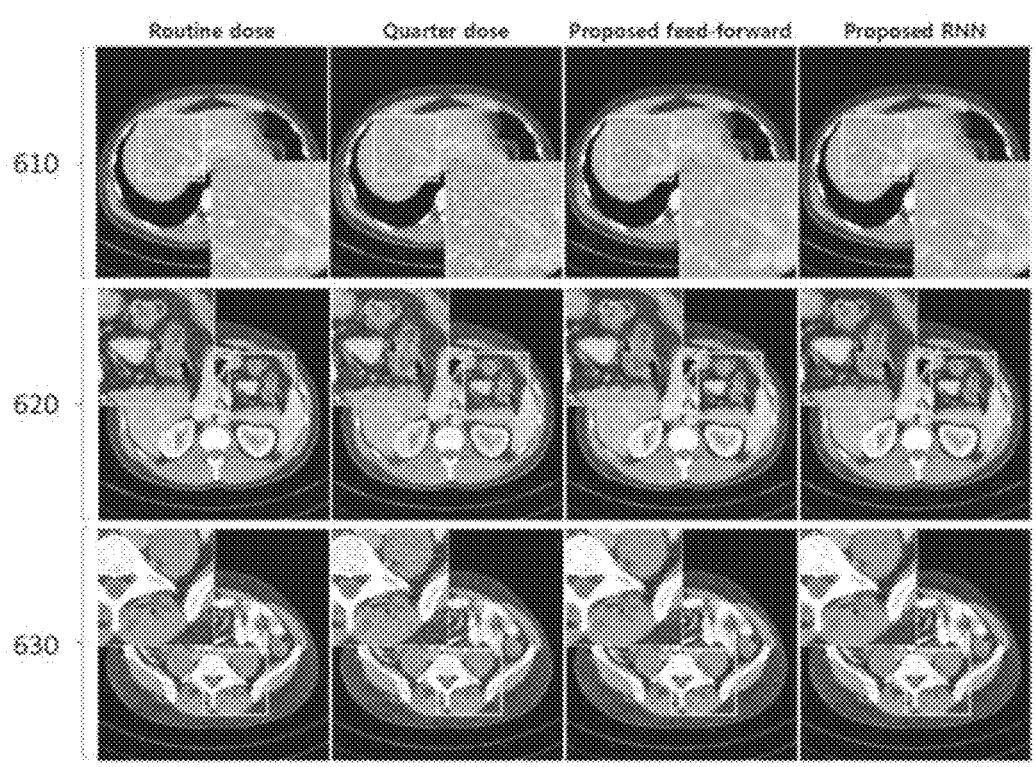
FIG. 6 is a drawing illustrating an example of a stationary image, an input image including noise, and a denoised output image according to an embodiment of the inventive concept.

FIG. 6 is a drawing illustrating an example of a stationary image, an input image including noise, and a denoised output image according to an embodiment of the inventive concept. FIG. 6 illustrates an example of a stationary CT reconstruction image (e.g., routine dose), a low-dose CT reconstruction image including noise (e.g., quarter dose image output using the neural network (e.g., proposed feed-forward), and an image output by applying the neural network to the framelet-based denoising algorithm (e.g., proposed RNN).

As shown in FIG. 6, in case of a CT image 610 showing the state of liver, it may be seen that noise is cancelled while the texture of liver is retained in the image reconstructed by an embodiment of the inventive concept. Moreover, as shown in reference numeral 620 of FIG. 6, it may be shown that noise is cancelled while the detailed structure of intestine is clearly maintained in the image reconstructed by an embodiment of the inventive concept. As shown reference numeral 630 of FIG. 6, it may be seen that the pelvic bone preserves the edge details well in the image reconstructed by an embodiment of the inventive concept.

Figure 7:
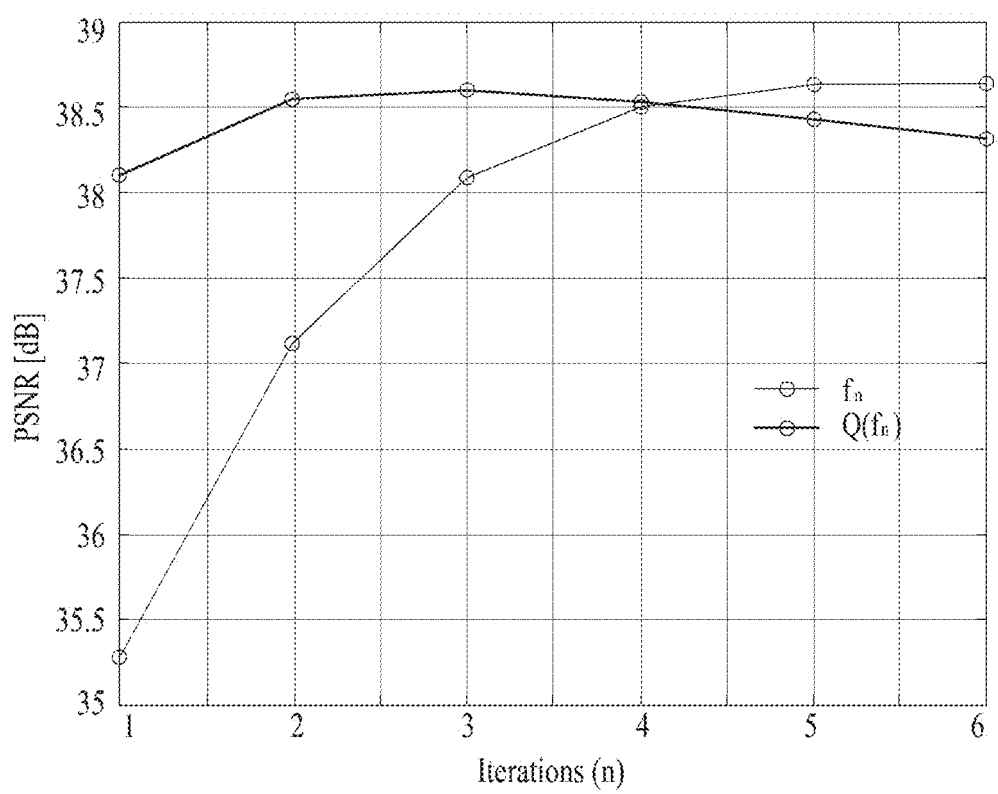
FIG. 7 is a drawing illustrating an example of the efficiency of a reconstruction method according to an embodiment of the inventive concept.

FIG. 7 is a drawing illustrating an example of the efficiency of a reconstruction method according to an embodiment of the inventive concept. FIG. 7 illustrates an example of measuring a degree to which the output image is reconstructed as an iterative process of applying a framelet-based denoising algorithm to a trained neural network proceeds, using a peak signal-to-noise ratio (PSNR).

As may be observed in a blue graph shown in FIG. 7, it may be seen that the result converges as iterations are performed by applying a trained neural network to a framelet-based denoising algorithm.

As such, the image reconstruction method according to embodiments of the inventive concept may overcome the limitation of a denoising algorithm based on an existing neural network and may quickly reconstruct a high-quality image by applying the neural network based on the convolutional framelet to the framelet-based denoising algorithm.

Furthermore, the image reconstruction method according to embodiments of the inventive concept may obtain more improved reconstruction performance than separating performing the neural network and the framelet-based denoising algorithm by using neural network and the framelet-based denoising algorithm Furthermore, the image reconstruction method according to embodiments of the inventive concept may enhance reconstruction performance and reduce a reconstruction time by reconstructing an image using the neural network configured according the conventional framelet.

Herein, the image reconstruction method according to embodiments of the inventive concept may reconstruct a high-quality image by applying the neural network and the momentum to iteratively perform the framelet-based denoising algorithm.

In the image reconstruction method according to embodiments of the inventive concept, the description is given of, but limited to, the wavelet transform. For example, all transform techniques such as a discrete cosine transform (DCT) and a Fourier transform may be applied to the image reconstruction method.

Figure 8:
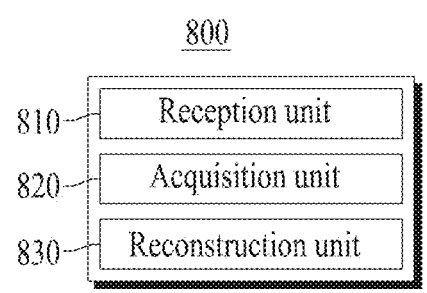
FIG. 8 is a block diagram illustrating a configuration of an image reconstruction device according to an embodiment of the inventive concept.

FIG. 8 is a block diagram illustrating a configuration of an image reconstruction device according to an embodiment of the inventive concept. FIG. 8 illustrates a configuration of a device which performs FIGS. 1 to 7.

Referring to FIG. 8, an image reconstruction device 800 according to an embodiment of the inventive concept may include a reception unit 810, an acquisition unit 820, and a reconstruction unit 830.

The reception unit 810 may receive a low-dose X-ray CT data.

The acquisition unit 820 may obtain an initial reconstruction image for the received low-dose X-ray CT image using a predetermined analytic algorithm.

Herein, the acquisition unit 820 may obtain the initial reconstruction image using an analytic algorithm including an FDK algorithm and an FBP algorithm.

The reconstruction 830 may reconstruct the obtained initial reconstruction image as a high-quality final image denoised using a previously trained neural network.

Herein, the reconstruction unit 830 may reconstruct the final image denoised by applying a framelet-based denoising algorithm to a neural network. For example, the reconstruction unit 830 may reconstruct the final image denoised by applying a convolutional framelet to the neural network.

Furthermore, the reconstruction unit 830 may reconstruct the final image by reconstructing an image denoised by applying the framelet-based denoising algorithm to the neural network, and by iteratively performing a process of updating an image denoised by applying the framelet-based denoising algorithm to the neural network again with respect to the reconstructed image.

Herein, when the image generated by the iterative update process and the image reconstruction process meets a predetermined convergence condition, the reconstruction unit 830 may reconstruct the image as the final image.

In addition, the reconstruction unit 830 may transform the initial reconstruction image into signals of predetermined different domains, may adjust coefficients of each of the transformed signals using a local basis function and a non-linear function, and may reconstruct the adjusted coefficients using dual basis vectors, thus inversely transforming the initial reconstruction image into the final image using the reconstructed coefficients corresponding to the different domains.

In this case, the reconstruction unit 830 may apply a non-local basis transform to the initial reconstruction image to transform the initial reconstruction image into multiple feature signals. For example, the reconstruction unit 830 may apply a wavelet transform to the initial reconstruction image to transform the initial reconstruction image into frequency domains, each of which has a different directional component of noise.

It is apparent to those skilled in the art that, although the description is omitted in the image reconstruction device 800 of FIG. 8, the respective components configuring FIG. 8 may include all details described in FIGS. 1 to 7.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

According to embodiments of the inventive concept, the image reconstruction device may overcome the limitation of a denoising algorithm based on an existing neural network and may quickly reconstruct a high-quality image by applying the neural network based on the convolutional framelet to the framelet-based denoising algorithm.

According to embodiments of the inventive concept, the image reconstruction device may obtain more enhanced reconstruction performance than separately performing the neural network and the framelet-based denoising algorithm by using the neural network and the framelet-based denoising algorithm.

According to embodiments of the inventive concept, the image reconstruction device may enhance reconstruction performance and may reduce a reconstruction time by reconstructing an image using a neural network configured according to the convolutional framelet.

According to embodiments of the inventive concept, the image reconstruction device may perform universal signal reconstruction by using transform and inverse transform which are applicable to a signal of any order and the neural network.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. An image reconstruction method, comprising:
receiving low-dose X-ray computed tomography (CT) data;
obtaining an initial reconstruction image for the received low-dose X-ray CT data using a predetermined analytic algorithm; and
reconstructing the obtained initial reconstruction image as a final image denoised by applying coefficients of a convolutional framelet to a previously trained neural network,
wherein the reconstructing the initial reconstruction image comprises
applying a basis vector to the initial reconstruction image to transform the initial reconstruction image into multiple feature signals,
applying a soft-thresholding function to the transformed multiple feature signals, and
applying a dual basis vector to a result of the soft-thresholding function.

2. The image reconstruction method of claim 1, wherein the reconstructing as the final image comprises:
reconstructing the final image by reconstructing an image denoised by applying a framelet-based denoising algorithm to the neural network, and by iteratively performing a process of updating an image denoised by applying the framelet-based denoising algorithm to the neural network with respect to the reconstructed image.

3. The image reconstruction method of claim 1, wherein the obtaining of the initial reconstruction image comprises:
obtaining the initial reconstruction image using an analytic algorithm including a Feldkamp-Davis-Kress (FDK) algorithm and a filtered-backprojection (FBP) algorithm.

4. The image reconstruction method of claim 1, wherein the reconstructing as the final image comprises:
transforming the initial reconstruction image into signals of predetermined different domains;
adjusting coefficients of each of the transformed signals using a local basis function and a non-linear function;
reconstructing the adjusted coefficients using dual basis vectors; and
inversely transforming the initial reconstruction image into the final image using the reconstructed coefficients corresponding to the different domains.

5. The image reconstruction method of claim 4, wherein the transforming of the initial reconstruction image into the signals of the different domains comprises:
transforming the initial reconstruction image into multiple feature signals by applying a non-local basis transform to the initial reconstruction image.

6. The image reconstruction method of claim 4, wherein the transforming of the initial reconstruction image into the signals of the different domains comprises:
transforming the initial reconstruction image into frequency domains, each of which has a different directional component of noise, by applying at least one of a wavelet transform, a discrete cosine transform, and a Fourier transform to the initial reconstruction image.

7. The image reconstruction method of claim 1, wherein the reconstructing as the final image comprises:
reconstructing the final image denoised using a convolutional neural network (CNN).

8. The image reconstruction method of claim 1, wherein the neural network has an encoding part and a decoding part which are in a symmetric architecture.

9. The image reconstruction method of claim 1, further comprising:
applying a framelet-based denoising algorithm to the neural network,
wherein the framelet-based denoising algorithm represents an input signal as a local basis or a non-local basis using a framelet.

10. The image reconstruction method of claim 1, wherein the soft-thresholding function is a non-linear function.

11. An image reconstruction method, comprising:
receiving low-dose X-ray CT data;
obtaining an initial reconstruction image for the received low-dose X-ray CT data using a predetermined analytic algorithm; and
reconstructing the obtained initial reconstruction image as a final image denoised by adjusting coefficients of a convolutional framelet using a previously trained neural network,
wherein the reconstructing the initial reconstruction image comprises
applying a basis vector to the initial reconstruction image to transform the initial reconstruction image into multiple feature signals,
applying a soft-thresholding function to the transformed multiple feature signals, and applying a dual basis vector to a result of the soft-thresholding function.

12. An image reconstruction device, comprising
a processor configured to:
receive low-dose X-ray CT data;
obtain an initial reconstruction image for the received low-dose X-ray CT data using a predetermined analytic algorithm; and
reconstruct the obtained initial reconstruction image as a final image denoised by applying coefficients of a convolutional framelet to a previously trained neural network,
wherein in reconstructing the initial reconstruction image, the processor is configured to
apply a basis vector to the initial reconstruction image to transform the initial reconstruction image into multiple feature signals,
apply a soft-thresholding function to the transformed multiple feature signals, and
apply a dual basis vector to a result of the soft-thresholding function.

13. The image reconstruction device of claim 12, wherein the reconstruction is configured to:
reconstruct the final image by reconstructing an image denoised by applying a framelet-based denoising algorithm to the neural network, and by iteratively performing a process of updating an image denoised by applying the framelet-based denoising algorithm to the neural network with respect to the reconstructed image.

14. The image reconstruction device of claim 12, wherein the processor is configured to:
obtain the initial reconstruction image using an analytic algorithm including an FDK algorithm and an FBP algorithm.

15. The image reconstruction device of claim 12, wherein the reconstruction is configured to:
transform the initial reconstruction image into signals of predetermined different domains;
adjust coefficients of each of the transformed signals using a local basis function and a non-linear function;
reconstruct the adjusted coefficients using dual basis vectors; and
inversely transform the initial reconstruction image into the final image using the reconstructed coefficients corresponding to the different domains.

16. The image reconstruction device of claim 15, wherein the processor is configured to:
transform the initial reconstruction image into multiple feature signals by applying a non-local basis transform to the initial reconstruction image.

17. The image reconstruction device of claim 15, wherein the processor is configured to:
transform the initial reconstruction image into frequency domains, each of which has a different directional component of noise, by applying a wavelet transform to the initial reconstruction image.

18. The image reconstruction device of claim 12, wherein the neural network has an encoding part and a decoding part which are in a symmetric architecture.

19. The image reconstruction device of claim 12, further comprising:
applying a framelet-based denoising algorithm to the neural network,
wherein the framelet-based denoising algorithm represents an input signal as a local basis or a non-local basis using a framelet.

20. The image reconstruction device of claim 12, wherein the soft-thresholding function is a non-linear function.

* * * * *